United States Patent
Ge et al.

(10) Patent No.: US 10,054,039 B2
(45) Date of Patent: Aug. 21, 2018

(54) TURBOCHARGER SYSTEM FOR AN ENGINE

(71) Applicant: Caterpillar Inc., Peoria, IL (US)

(72) Inventors: Xinyu Ge, Peoria, IL (US); Yongli Qi, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 168 days.

(21) Appl. No.: 15/142,920

(22) Filed: Apr. 29, 2016

(65) Prior Publication Data

US 2016/0237882 A1 Aug. 18, 2016

(51) Int. Cl.
| | |
|---|---|
| *F02B 33/44* | (2006.01) |
| *F02D 23/00* | (2006.01) |
| *F02B 33/00* | (2006.01) |
| *F02B 37/18* | (2006.01) |
| *F02B 37/013* | (2006.01) |
| *F02D 41/04* | (2006.01) |
| *F02D 41/06* | (2006.01) |
| *F02B 21/00* | (2006.01) |

(Continued)

(52) U.S. Cl.
CPC ............. *F02B 37/18* (2013.01); *F02B 21/00* (2013.01); *F02B 33/44* (2013.01); *F02B 37/004* (2013.01); *F02B 37/013* (2013.01); *F02B 73/00* (2013.01); *F02D 25/00* (2013.01); *F02D 41/0007* (2013.01); *F02D 41/04* (2013.01); *F02D 41/062* (2013.01); *Y02T 10/144* (2013.01)

(58) Field of Classification Search
CPC ........ F02B 37/18; F02B 21/00; F02B 37/004; F02B 33/44; F02B 73/00; F02S 25/00; F02D 41/0007; F02D 41/04; F02D 41/062; Y02T 10/144
USPC .......................... 60/612, 611, 602; 123/562
See application file for complete search history.

(56) References Cited

U.S. PATENT DOCUMENTS

| | | | | |
|---|---|---|---|---|
| 4,563,132 A | * | 1/1986 | Grimmer | F02B 37/007 |
| | | | | 60/612 |
| 5,064,423 A | * | 11/1991 | Lorenz | F02B 33/44 |
| | | | | 60/611 |

(Continued)

FOREIGN PATENT DOCUMENTS

| | | | | |
|---|---|---|---|---|
| DE | 10239110 A1 | * | 3/2004 | ............ F02B 37/013 |
| GB | 2121474 A | * | 12/1983 | ............ F02B 37/013 |

(Continued)

*Primary Examiner* — Thai Ba Trieu
(74) *Attorney, Agent, or Firm* — James S. Bennin

(57) ABSTRACT

A system having an engine is provided. The system includes a high pressure (HP) turbocharger and a low pressure (LP) turbocharger connected in series with each other. The system also includes a first valve assembly configured to selectively bypass at least a portion of the exhaust from the engine to the LP turbocharger. The system also includes a storage tank configured to store a pressurized fluid and configured to be in fluid communication with the HP turbocharger and the LP turbocharger. The system further includes a second valve assembly in fluid communication with the storage tank, the HP turbocharger and the LP turbocharger. The system also includes a controller operatively coupled to the first valve assembly and the second valve assembly. The controller is configured to selectively operate the first valve assembly and the second valve assembly based on a change in a load requirement on the engine.

5 Claims, 2 Drawing Sheets

(51) Int. Cl.
F02B 37/00 (2006.01)
F02B 73/00 (2006.01)
F02D 25/00 (2006.01)
F02D 41/00 (2006.01)

(56) References Cited

U.S. PATENT DOCUMENTS

| | | | |
|---|---|---|---|
| 8,281,587 B2 * | 10/2012 | Xin | F02D 23/00 |
| | | | 60/611 |
| 8,793,995 B2 | 8/2014 | Gerum | |
| 9,127,602 B2 | 9/2015 | Ibuki | |
| 2011/0081257 A1 * | 4/2011 | Kley | F02D 41/0007 |
| | | | 417/53 |
| 2013/0298552 A1 | 11/2013 | Branyon et al. | |
| 2015/0139777 A1 | 5/2015 | Almkvist et al. | |
| 2016/0305374 A1 * | 10/2016 | Jayakar | F02M 26/35 |

FOREIGN PATENT DOCUMENTS

| | | | |
|---|---|---|---|
| GB | 2488378 | 8/2012 | |
| JP | 2015113738 A * | 6/2015 | ............ F02B 37/013 |
| WO | 2012051784 | 4/2012 | |

* cited by examiner

TURBOCHARGER SYSTEM FOR AN ENGINE

TECHNICAL FIELD

The present disclosure relates to a common rail system having multiple engines, and more particularly, to a system and a method of controlling fluid communication for turbochargers associated with each of the multiple engines.

BACKGROUND

Generally, in rig applications, such as drilling rigs and production platforms, an electric power is supplied by one or more generators. The rig applications may include pumps, motors, drive system(s), pipe racking systems, hydraulic power units, and/or a variety of rig utilities. The generators may run on natural gas or diesel fuel or other hydrocarbon fuel. In some cases, a response to external loads by an engine of these rig applications may be sluggish, when the engine runs on natural gas. Various turbochargers may be configured to utilize exhaust from the engine and supply a compressed air for operation of the engine. However, there may be a lag from turbochargers in responding to different power demands thereby effecting response of the engine to power demands. Such a sluggish response from the engines can negatively affect operations.

In order to improve the response, the engines may have to run on full load condition. In rig applications, operations are intermittent and it is difficult and/or expensive to maintain the engines at a constant heavy loading. In some situations, to compensate for sluggish engine response, artificial loads are used to keep engine loads high so that when real demands come in, the real power demand will take the portion released by the reduction of the artificial loads. However, it is not cost effective to provide full load all the time, as engines burn fuel to generate power.

Furthermore, multiple turbochargers in series are widely used in diesel or natural gas engines to provide high power. The turbochargers in series can provide enough airflow for the full load operating conditions but tend to lack air flow for part load conditions.

In some situations, with multiple engines and associated turbochargers, a rig control system may operate one engine at a full load, and may slightly reduce a power output for rest of the engines. However, these engines still may have to run at relatively high load conditions to minimize the turbocharger lag. It is most cost effective to put some engines on idle condition when power demand is low. However, the response needs to be improved when the demand is coming.

For reference, U.K. Patent GB2,488,378B (hereinafter the '378 reference) is related to a vehicle powered by a turbocharged internal combustion engine. The engine has at least one air or gas nozzle positioned within an air intake duct upstream of the turbo-blower of the turbocharger and connected to receive compressed air or compressed gases from a compressed air or gas supply, such as a storage tank, on board the vehicle. The air or gas nozzle is directed to deliver at least one jet of the compressed air or gases towards the impeller of the compressor such that the expanding momentum flux of the jet or jets fills the frontal entry area of the impeller thereby entraining and accelerating the intake air arriving at the impeller and increasing the exit boost pressure produced by the turbo-blower of the turbocharger.

However, the '378 reference does not disclose a system for operation of multiple turbochargers connected in series. Therefore, there exists a need for an efficient control during a transient load change of the engine.

SUMMARY OF THE DISCLOSURE

In an aspect of the present disclosure, a system having an engine is provided. The system includes a high pressure (HP) turbocharger in fluid communication with the engine to receive an exhaust therefrom. The system also includes a low pressure (LP) turbocharger connected in series arrangement with the HP turbocharger. The system further includes a first valve assembly in fluid communication with the engine and the LP turbocharger. The first valve assembly is configured to selectively bypass at least a portion of the exhaust from the engine to the LP turbocharger. The system also includes a storage tank configured to store a pressurized fluid and configured to be in fluid communication with the HP turbocharger and the LP turbocharger. The system further includes a second valve assembly in fluid communication with the storage tank, the HP turbocharger and the LP turbocharger. The system also includes a controller operatively coupled to the first valve assembly and the second valve assembly. The controller is configured to selectively operate the first valve assembly and the second valve assembly based on a change in a load requirement on the engine.

DETAILED DESCRIPTION

Figure 1:
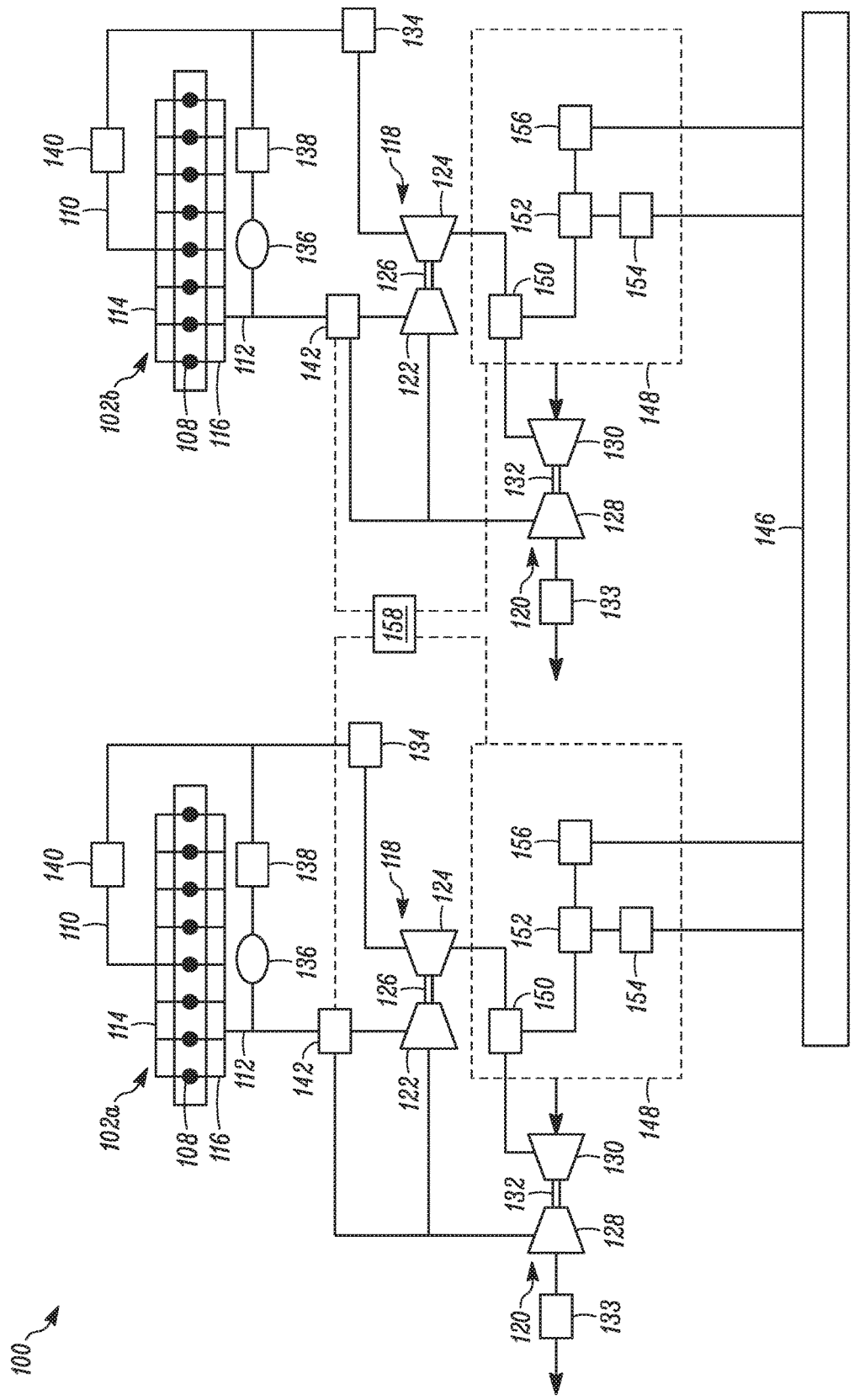
FIG. 1 is a schematic representation of a common rail system having a plurality of engines and each of the plurality of engines having turbochargers connected in series, in accordance with an embodiment of the present disclosure.

Wherever possible, the same reference numbers will be used throughout the drawings to refer to the same or the like parts. Referring to FIG. 1, a system 100 having multiple engines is illustrated. Although, two engines 102a, 102b (also collectively referred to as 'the engine/s 102') are shown, it may be recognized that the system 100 may include any number of engines. In the illustrated embodiment, the engines 102a and 102b are substantially similar to each other having similar type of components. However, in other embodiments, the engines 102a, 102b may be different from each other. For example, the engines 102a, 102b may have different configurations.

The engines 102 may be an internal combustion engine having a plurality of cylinders 108. In the example illustrated in FIG. 1, the cylinders 108 are arranged in an in-line configuration. However, the present disclosure is independent of the particular cylinder arrangement and may also be applied to V-type, rotary configurations, for example. Similarly, while 8-cylinder engine 102 is illustrated, the present disclosure may be applied to internal combustion engines having any number of cylinders 108. Further, the engine 102 may be any one of a compression ignition engine or a spark ignition engine. Those of ordinary skill in the art will recognize that the present disclosure is generally independent of the particular type of engine 102.

The cylinders 108 may receive intake air from an intake line 110. Further, an exhaust from the cylinders 108 may be carried in an exhaust line 112. In an embodiment, each of the intake line 110 and the exhaust line 112 includes an intake manifold 114 and an exhaust manifold 116 respectively. The intake manifold 114 is in fluid communication with the cylinders 108. Further, the exhaust manifold 116 is in fluid communication with the cylinders 108.

Each of the engines 102a, 102b may be associated with one or more turbochargers to compress the intake air for use in combustion. In the illustrated embodiment, each of the engines 102a, 102b is associated with a high pressure (HP) turbocharger 118 and a low pressure (LP) turbocharger 120 connected in series. The HP turbocharger 118 includes a turbine 122, a compressor 124 and a connecting shaft 126. Similarly, the LP turbocharger 120 includes a turbine 128, a compressor 130 and a connecting shaft 132. The turbines 122, 128 are driven by the exhaust from the combustion in the cylinders 108, thereby rotating the shafts 126, 132 which in turn rotates the compressors 124, 130 respectively. As such, the compressors 124, 130 compress the intake air and provide the pressurized air to the intake line 110. The compressors 124, 130, generally may receive the fresh intake air and provide the compressed air to the intake manifold 114 for combustion.

The compressor 130 of the LP turbocharger 120 is fluidly coupled to the compressor 124 of the HP turbocharger 118 to supply the compressed air thereto. Further, the turbine 128 of the LP turbocharger 120 is fluidly coupled to the turbine 122 of the HP turbocharger 118 to receive the exhaust therefrom. Further, the exhaust from the LP turbocharger 120 is discharged into an after-treatment module 133.

The system 100 also includes a charge air cooler 134 configured to receive the compressed air from the HP turbocharger 118. The charge air cooler 134 may be configured to cool the compressed air and supply the compressed air to the intake line 110.

The system 100 also includes an exhaust recirculation (EGR) valve 136 in fluid communication with the exhaust manifold 116. The EGR valve 136 allows a portion of the exhaust to be recirculated into the intake line 110. The system 100 also includes an EGR cooler 138 in fluid communication with the EGR valve 136 and configured to cool the exhaust passing through the EGR valve 136.

The system 100 also includes a mixer 140 configured to mix the intake air, the recirculated exhaust and the fuel (e.g. natural gas), to increase an efficiency of the combustion. The mixer 140 is in fluid communication with the charge air cooler 134 and the EGR cooler 138 to receive the compressed air and the recirculated exhaust respectively. The mixer 140 is also configured to receive fuel from a fuel source (not shown), such as a fuel storage tank or a gas pipeline. The mixture of the air and the fuel is passed onto the intake manifold 114 that distributes the mixture of the intake air and fuel to the cylinders 108 as required.

The system 100 further includes a first valve assembly 142 in fluid communication with the corresponding engine 102 and the LP turbocharger 120. The first valve assembly 142 is configured to selectively provide at least a portion of the exhaust from the engine 102 to the LP turbocharger 120 by bypassing the HP turbocharger 118. In an embodiment, the first valve assembly 142 is an exhaust by-pass valve 142. The exhaust by-pass valve 142 may provide fluid communication between the exhaust manifold 116 and each of the HP turbocharger 118 and the LP turbocharger 120.

In an embodiment, the exhaust by-pass valve 142 may be a two-way valve. In one example, the exhaust by-pass valve 142 may be an ON/OFF valve. In another example, the exhaust by-pass valve 142 may be a proportional valve. Other configurations of the exhaust by-pass valve 142 may also be contemplated to suit the application. In an embodiment, the exhaust by-pass valve 142 may be electronically controlled.

Upon regulating the exhaust by-pass valve 142, a portion of the exhaust that can be directed to the turbines 122, 128 of the respective HP turbocharger 118 and the LP turbocharger 120 may be adjusted. For example, in a completely closed position of the exhaust by-pass valve 142, the fluid communication between the exhaust line 112 and the LP turbocharger 120 may be blocked. Similarly, in an open position of the exhaust by-pass valve 142, a portion of the exhaust is directed to the LP turbocharger 120.

The system 100 also includes a storage tank 146 configured to store a pressurized fluid. The storage tank 146 is configured to be in fluid communication with the HP turbocharger 118 and the LP turbocharger 120. Moreover, the storage tank 146 may be in fluid communication with the HP turbocharger 118 and LP turbochargers 120 of each of the engines 102a, 102b.

The system 100 further includes a second valve assembly 148 in fluid communication with the HP turbocharger 118 and the LP turbocharger 120 of the corresponding engine 102. The second valve assembly 148 may also be in fluid communication with the storage tank 146.

In an embodiment, the second valve assembly 148 includes a compressor by-pass valve 150 in fluid communication with the compressor 124 of the HP turbocharger 118 and the compressor 130 of the LP turbocharger 120. In an embodiment, the compressor by-pass valve 150 may be a two-way valve. In one example, the compressor by-pass valve 150 may be an ON/OFF valve. In another example, the compressor by-pass valve 150 may be a proportional valve. Other configurations of the compressor by-pass valve 150 may also be contemplated to suit the application.

The second valve assembly 148 further includes a switch valve 152 and a check valve 154. The second valve assembly 148 also includes a pressure regulator 156 fluidly coupled between the storage tank 146 and the switch valve 152. The check valve 154 may be fluidly coupled between the storage tank 146 and the switch valve 152. The switch valve 152 may be fluidly coupled between the pressure regulator 156, the compressor by-pass valve 150 and the check valve 154.

The check valve 154 may be a directional valve configured to allow a unidirectional flow of the air from the compressor by-pass valve 150 to the storage tank 146. The switch valve 152 may be configured to effect a fluid communication between the compressor by-pass valve 150 and the check valve 154. The switch valve 152 may also be configured to effect a fluid communication between the compressor by-pass valve 150 and the pressure regulator 156. In an embodiment, the pressure regulator 156 may be electronically controlled.

For example, a first position of the switch valve 152 may allow a flow of the air from the compressor by-pass valve 150 to the check valve 154 and in turn to the storage tank 146. As such, the storage tank 146 may be charged with the air. A second position of the switch valve 152 may allow a flow of the air from the storage tank 146, through the pressure regulator 156 to the compressor by-pass valve 150. With such an implementation, the storage tank 146 may discharge the air. In one embodiment, the switch valve 152 is a 3-way-2-position valve.

The system 100 includes a controller 158 operatively coupled to the first valve assembly 142 and the second valve assembly 148. The controller 158 is configured to selectively operate the first valve assembly 142 and the second valve assembly 148 based on a change in a load requirement on the engine 102. Moreover, the controller 158 may individually operate the first valve assembly 142 and the second valve assembly 148, of each of the engines 102a, 102b of the system 100.

As one of ordinary skill in the art will appreciate, the system 100 may include various conventional sensors and actuators in addition to those illustrated in FIG. 1. In an embodiment, the system 100 may include a load sensor (not shown) in communication with the controller 158. In another embodiment, the controller 158 may determine the load on the engine 102 based on an engine rotational speed and/or torque of the engine 102.

Further, the controller 158 may receive data such as, piston position, engine rotational speed, turbo wheel speed, vehicle speed, coolant temperature, intake manifold pressure, turbo boost, accelerator pedal position, air temperature, exhaust temperature, exhaust air to fuel ratio, exhaust component concentration, and demanded or actual air flow, for example from the sensors.

The controller 158 may include a single microprocessor or a set of microprocessors. In an embodiment, the controller 158 may be in communication with an engine control unit (ECU) of each of the engines 102. The controller 158 may include a computer readable storage media having instructions executable by the controller 158. The computer readable storage media may include volatile and nonvolatile or persistent storage in read-only memory (ROM), keep-alive memory (KAM), and random-access memory.

In an embodiment, the controller 158 may be configured to operate the first valve assembly 142 and the second valve assembly 148 in a charging mode. In another embodiment, the controller 158 may be configured to operate the first valve assembly 142 and the second valve assembly 148 in a discharging mode. In yet another embodiment, the controller 158 may be configured to operate the first valve assembly 142 and the second valve assembly 148 in a disconnected mode. Each of the charging mode, the discharging mode and the disconnected mode is based on a load on the engine 102 and will be explained in detail herein.

In an embodiment, the controller 158 may be configured to operate the first and second valve assemblies 142, 148 in the charging mode, when the corresponding engine 102 is running at a steady state high or full load conditions. In one example, when there is a steady load requirement of greater than or equal to 75%, the controller 158 may operate the first and second valve assemblies 142, 148 of at least one of the engines 102 in the charging mode. In another example, when there is a steady load requirement of greater than or equal to 85%, the controller 158 may operate the first and second valve assemblies 142, 148 of at least one of the engines 102 in the charging mode. In an embodiment, the controller 158 may switch the charging mode from one engine to other engines 102 after every predetermined time interval, during the steady state condition.

In the charging mode, the controller 158 may actuate the exhaust by-pass valve 142 to the open position, so as to allow a portion of the exhaust to bypass around the HP turbocharger 118. As such, a portion of the exhaust flows to the turbine 128 of the LP turbocharger 120 and another portion of the exhaust flows to the turbine 122 of the HP turbocharger 118. Accordingly, the turbine 128 of the LP turbocharger 120 may execute more work and thereby more airflow is supplied by the LP turbocharger 120.

In the charging mode, the controller 158 may regulate the compressor by-pass valve 150 to allow at least a portion of the compressed air to flow from the compressor 130 of the LP turbocharger 120 to the storage tank 146. Further, a remaining portion of the compressed air from the compressor 130 of the LP turbocharger 120 flows to the compressor 124 of the HP turbocharger 122 and subsequently to the corresponding engine 102. Depending on the load requirement and the capacity of the storage tank 146, the controller 158 may adjust the compressor by-pass valve 150 to control allocation of the compressed air to the storage tank 146. As such, the storage tank 146 may be charged with the compressed air during the charging mode.

In an embodiment, the controller 158 may operate the first valve assembly 142 and the second valve assembly 148 in the disconnection mode when the storage tank 146 reaches a predefined capacity. In an example, the predefined capacity may be a full capacity of the storage tank 146. In the disconnection mode, the controller 158 may block the fluid communication from the HP and LP turbochargers 118, 120 of all the engines 102 to the storage tank 146. Further, the controller 158 may suitably adjust the exhaust by-pass valve 142 to maximize a combined efficiency of the HP turbocharger 118 and the LP turbocharger 120 during the disconnection mode.

As described above, as the engine 102 operates at the full load or the high load, the storage tank 146 may receive the compressed air from the turbochargers of the corresponding engine 102. When the capacity of the storage tank 146 becomes greater than the predefined capacity, the controller 158 may block the fluid communication to the storage tank 146.

In an embodiment, the controller 158 may be configured to operate the first and second valve assemblies 142, 148 in the discharging mode, when an external load requirement becomes greater than a predefined limit. In an example, the predefined limit may correspond to the load above which, at least one of the engines 102 may have to continue to operate at the high load and the other engine 102 needs to be transferred to the high load or the full load. The engine 102 may be at one of a warm up state, a start-up stage or a low load condition and may need to be transferred to the full load or the high load because of the load requirement. In one example, the full load condition may be 100% load, the high load may be 75% or greater, and the low load may be 10%.

In such a case, the controller 158 may operate the first and second valve assemblies 142, 148 of the engine 102 that is being transferred to the full load condition in the discharging mode. In the discharging mode, the controller 158 may actuate the exhaust by-pass valve 142 to the closed position, so as to block the direct flow of the exhaust to the LP turbocharger 120 from the engine 102. Instead, the complete flow of the exhaust is directed to the HP turbocharger 118 before the exhaust reaches the LP turbocharger 120. As such, the turbine 122 of the HP turbocharger 118 may execute more work as more compressed airflow need to be supplied by the compressor 124 of the HP turbocharger 118.

In the discharging mode, the controller 158 may also control the second valve assembly 148 to allow at least a portion of the compressed air to flow from the storage tank 146 to the compressor of the HP turbocharger 118. Specifically, the controller 158 may control the pressure regulator 156 and the compressor by-pass valve 150 to allow a regulated amount of the compressed air to flow from the storage tank 146 to the compressor 124 of the HP turbocharger 118.

As such, the engine 102 may efficiently operate during the transient condition, when there is a sudden increase in the load. Moreover, the compressed air supplied from the storage tank 146 may be utilized for combustion to transfer from any of the start-up, warm up or low load conditions to the high load condition.

INDUSTRIAL APPLICABILITY

With use and implementation of the system 100 of the present disclosure, the associated engines may be operated at different steady load and transient conditions. As discussed above, the controller 158 may control the first and second valve assemblies 142, 148 to selectively operate in the charging mode, the discharging mode and the disconnected mode based on the load.

Figure 2:
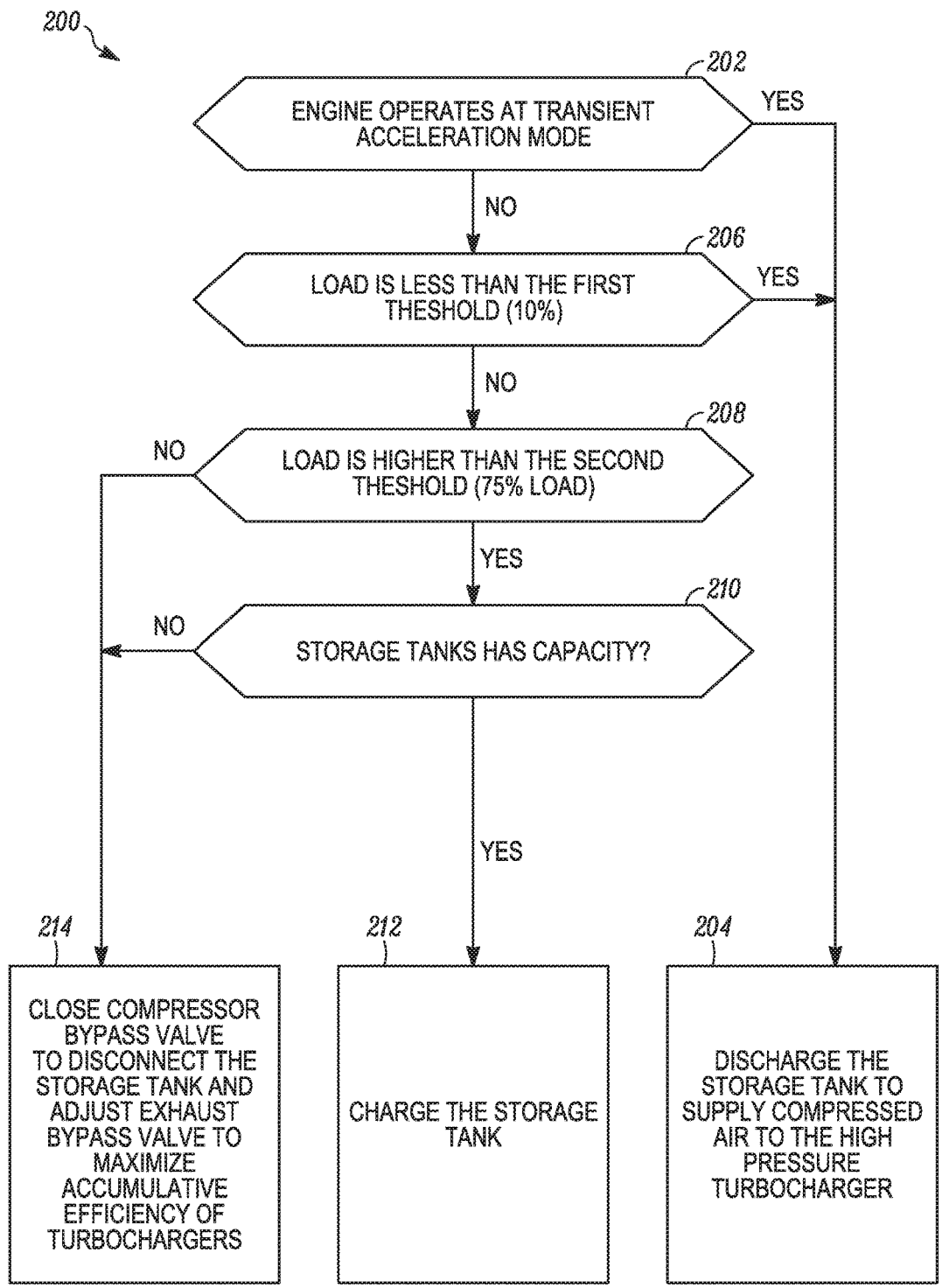
FIG. 2 is an exemplary algorithm for a method of operating the system of FIG. 1, in accordance with an embodiment of the present disclosure.

Referring to FIG. 2, an exemplary algorithm for a method 200 of operation of the system 100 is illustrated. In an embodiment, one or more steps of the method 200 may be executed by the controller 158 of the system 100. The method 200 will be explained in conjunction with one of the engines 102, however, it should be recognized that the concepts of the method 200 may be suitably implemented for the other engines 102.

At step 202, the method 200 includes determining if the engine 102 is in a transient accelerating mode. In an embodiment, the transient accelerating mode includes transferring from the warm up stage or the low load stage, to the high load or the full load. For example, when there is sudden increase of load while the engine 102 is in the warm up stage, the transient accelerating mode may occur. In an embodiment, the controller 158 may determine that the engine 102 is in the transient accelerating mode based on the load on the engine 102.

The control may be passed to step 204, if it is determined that the engine 102 is in the transient accelerating mode at step 202. At step 204, the method 200 includes controlling the first and second valve assemblies 142, 148 of the engine 102 to operate in the discharging mode. As such, the HP turbocharger 118 may readily receive compressed air from the storage tank 146 which in turn is supplied to the engine 102 to support the combustion.

With such an implementation, a turbocharger lag due to unavailability of the exhaust for the operation of the HP turbocharger 118 during the start-up or warm up state of the engine 102 may be avoided by supplying the compressed air from the storage tank 146.

The control may be passed to step 206, if it is determined that the engine 102 is not in the transient accelerating mode at step 202. At step 206, the method 200 includes determining if the load on the engine 102 is less than a first threshold. In an example, the first threshold may be equal to 10%. The control may be passed to step 204, if it is determined that the load is less than the first threshold at step 206.

The control may be passed to step 208, if it is determined that the load is greater than or equal to the first threshold at step 206. At step 208, the method 200 includes determining if the load on the engine 102 is greater than a second threshold. In an example, the second threshold may be equal to 75%. The control may be passed to step 210, if it is determined that the load is greater than the second threshold at step 208. At step 210, the method 200 includes determining if the current capacity of the storage tank 146 is less than the predefined capacity. The control may be passed to step 212, if it is determined that the current capacity is less than the predefined capacity.

Further, if at step 210, it is determined that the current capacity is greater than the predefined capacity, the control may be passed to step 214. At step 214, the method 200 includes controlling the first and second valve assemblies 142, 148 of the engine 102 to operate in the disconnection mode. In the disconnection mode, the fluid communication from the HP turbocharger 118 or LP turbocharger 120 to the storage tank 146 may be blocked, by closing the compressor bypass valve 150. Further, the exhaust by-pass valve 142 may be suitably adjusted to maximize the efficiency of the HP and LP turbochargers 118, 120.

At step 212, the method 200 includes controlling the first and second valve assemblies 142, 148 of the engine 102 to operate in the charging mode. As such, the storage tank 146 may receive the compressed air from the LP turbocharger 120. Such a compressed air from the storage tank 146 may be supplied to the HP turbocharger 118 which in turn is supplied to the engine 102 for combustion during the discharging mode. Referring back to step 208, if at step 208, it is determined that the load is less than or equal to the second threshold, the control may be passed to step 214.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A turbocharger system having an engine a storage tank, the system comprising:
   a high pressure turbocharger including:
      a turbine in fluid communication with an the engine to receive an exhaust gas therefrom; and
      a compressor;
   a low pressure turbocharger connected in series arrangement with the high pressure turbocharger and including:
      a turbine in fluid communication with an exhaust bypass valve and the turbine of the high pressure turbocharger; and
      a compressor in fluid communication with a compressor bypass valve;
         wherein the compressor of the high pressure turbocharger is in fluid communication with the compressor of the low pressure turbocharger via the compressor bypass valve;
         wherein the exhaust bypass valve is in fluid communication with the engine, the turbine of the low pressure turbocharger and the turbine of the high pressure turbocharger;
         wherein the exhaust bypass valve is configured to selectively bypass the exhaust gas from the engine to the turbine of the low pressure turbocharger without passing through the turbine of the high pressure turbocharger;
         wherein the compressor bypass valve is in fluid communication with a switch valve;
         wherein the switch valve is connected to the storage tank via a check valve in a charging mode and via a pressure regulator in a discharging mode; and
   a controller operatively coupled to the exhaust bypass valve, the compressor bypass valve and the switch valve, the controller configured to selectively operate the exhaust bypass valve, the compressor bypass valve and the switch valve based on a change in a load requirement on the engine.

2. The system of claim 1 further including multiple engines, each of the multiple engines including an associated high pressure turbocharger having a turbine and a compressor, low pressure turbocharger having a turbine and a compressor, exhaust bypass valve, compressor bypass valve, switch valve, check valve and pressure regulator;

wherein the compressor of the high pressure turbocharger and the compressor of the low pressure turbocharger of said each of the multiple engines are fluidly coupled with the storage tank; and wherein the controller individually controls the exhaust bypass valve, the compressor bypass valve, and the switch valve for said each of the multiple engines based on a change in the load requirement on the system.

3. The system of claim 1, wherein the controller is configured to operate the exhaust bypass valve, the compressor bypass valve and the switch valve in a charging mode for the storage tank during a steady state condition of the engine, and the controller is further configured to:

operate the exhaust bypass valve to bypass at least a portion of the exhaust from the engine to the turbine of the low pressure turbocharger; and operate the compressor bypass valve and the switch to allow a pressurized air to flow from the compressor of the low pressure turbocharger to the switch valve, and to a check valve, and finally to the storage tank.

4. The system of claim 1, wherein the controller is configured to operate the exhaust bypass valve, the compressor bypass valve and the switch valve in a discharging mode for the storage tank during at least one of a startup condition and an increase in load requirement on the engine, and the controller is further configured to:

operate the exhaust bypass valve to block direct fluid communication between the engine and the turbine of the low pressure turbocharger; and operate the compressor bypass valve and the switch valve to allow pressurized air to flow from the storage tank to a pressure regulator, and to the switch valve, and finally to the compressor of the high pressure turbocharger.

5. The system of claim 1, wherein the controller operates the exhaust bypass valve, the compressor bypass valve and the switch valve in a disconnected mode for the storage tank based on a capacity of the storage tank, and the controller is further configured to:

operate the exhaust bypass valve to maximize an efficiency of the high pressure turbocharger and the low pressure turbocharger; and operate the compressor bypass valve to block fluid communication of the switch valve with each of the compressor of the high pressure turbocharger and the compressor of the low pressure turbocharger.

\* \* \* \* \*